United States Patent [19]

Vross et al.

[11] Patent Number: 5,762,664
[45] Date of Patent: Jun. 9, 1998

[54] MOBILE VESSEL FOR REMOVAL OF NOXIOUS FUMES

[75] Inventors: Anthony R. Vross, Canfield; Jeffrey J. Sipos, Austintown; James J. Simon, Jr., Poland, all of Ohio

[73] Assignee: National Tool and Equipment, Inc., Boardman, Ohio

[21] Appl. No.: 768,963

[22] Filed: Dec. 18, 1996

[51] Int. Cl.$^6$ .............................. B01D 50/00; B67D 5/62; E01C 19/45

[52] U.S. Cl. .................. 55/319; 55/323; 55/356; 55/385.4; 55/385.7; 55/472; 55/485; 96/135; 96/140; 126/343.5 A

[58] Field of Search .......................... 55/318, 319, 320, 55/321, 322, 323, 356, 358, 385.1, 385.4, 385.7, 467, 472, 485, 486, DIG. 10; 96/135, 136, 138, 140, 142; 126/343.5 A; 422/169, 182; 454/63, 64, 65, 92, 117

[56] References Cited

U.S. PATENT DOCUMENTS

| | | |
|---|---|---|
| 935,681 | 10/1909 | Obermann. |
| 2,648,264 | 8/1953 | Green .................. 126/343.5 A |
| 2,773,496 | 12/1956 | Czarnecki .................. 126/343.5 A |
| 2,970,351 | 2/1961 | Rice. |
| 3,046,977 | 7/1962 | Figge .................. 128/343.5 A |
| 3,581,782 | 6/1971 | Onufer .................. 141/59 |
| 3,675,400 | 7/1972 | Kubsch. |
| 3,844,901 | 10/1974 | Roe et al. .................. 202/263 |
| 3,955,236 | 5/1976 | Mekelburg .................. 15/314 |
| 4,033,328 | 7/1977 | Lohman et al. .................. 126/343.5 A |
| 4,082,083 | 4/1978 | Horne .................. 126/343.5 A |
| 4,087,333 | 5/1978 | Naevestad .................. 202/227 |
| 4,450,900 | 5/1984 | Nathan .................. 165/42 |
| 4,512,245 | 4/1985 | Goldman. |
| 4,563,943 | 1/1986 | Bertelsen. |
| 4,620,645 | 11/1986 | Hale .................. 126/343.5 A |
| 4,770,088 | 9/1988 | Kistner. |
| 4,804,392 | 2/1989 | Spengler .................. 55/356 |
| 4,865,628 | 9/1989 | Iwanczyk. |
| 5,004,483 | 4/1991 | Eller et al.. |
| 5,036,754 | 8/1991 | Simms et al.. |
| 5,064,451 | 11/1991 | Phillips. |
| 5,069,691 | 12/1991 | Travis et al.. |
| 5,073,259 | 12/1991 | Solimar .................. 210/232 |
| 5,160,515 | 11/1992 | Nelson et al. .................. 55/267 |
| 5,191,909 | 3/1993 | Nadeau et al. .................. 135/93 |
| 5,239,615 | 8/1993 | Moore et al. .................. 126/343.5 A |
| 5,281,246 | 1/1994 | Ray et al. .................. 55/302 |
| 5,591,244 | 1/1997 | Vross et al. .................. 55/356 |

FOREIGN PATENT DOCUMENTS 37 342371 A1   4/1989   Germany.

OTHER PUBLICATIONS

Modular Media Filters–894 10M 1994, Aercology, Inc., 8 printed pages.

Primary Examiner—C. Scott Bushey
Attorney, Agent, or Firm—Sand & Sebolt

[57] ABSTRACT

A mobile vessel which reduces the transmission of noxious fumes into the surrounding atmosphere emanating from material contained in a material chamber in the vessel, such as bituminous roofing material. An air plenum extends along the vessel beneath a filtration unit and receives noxious fumes from the material chamber and from an outside source through ducts. Ambient air is mixed with the fumes for cooling the fumes upstream from the filtration unit. A heater and stirrer are located within the material chamber for uniformly heating the material. A power operated ram and heated breaker bars move and break a solidified key of the material for subsequent discharge into the material chamber. A blower creates a negative pressure in the air plenum and filtration unit for moving the fumes and ambient cooling air therethrough.

18 Claims, 5 Drawing Sheets

MOBILE VESSEL FOR REMOVAL OF NOXIOUS FUMES

BACKGROUND OF THE INVENTION

1. Technical Field

The invention relates to a mobile vessel for removing noxious fumes emanating from heated material within a storage chamber in the vessel. More particularly, the invention relates to such a mobile vessel which is used for heating and supplying hot roofing materials for waterproofing a roof which is extremely compact and which contains a filtration unit which collects and filters the noxious fumes from the material storage chamber within the vessel and from a outside source prior to discharging the cleaned fumes into the surrounding atmosphere.

2. Background Information

A fume problem exists for roofing companies and their customers during the application of hot roofing materials to a roof for waterproofing the roof. Fumes from roofing tar, asphalt or other bituminous products can contaminate food or beverages and are potentially hazardous to people inhaling the fumes. The fumes escape at a job site into the surrounding atmosphere from several areas. One is the mobile device, referred to in the roofing industry as the kettle, contains a supply of the roofing material which is heated and then discharged into another type of mobile vessel such as a lugger, which is usually located on top of the roof. The fumes escape from both the kettle and from the lugger into the atmosphere which is unacceptable and in certain applications not permitted due to environmental laws.

The problem has been recognized in the industry and others have attempted to solve the same. For example, U.S. Pat. No. 4,770,088 shows a mobile enclosure which moves along the roof and encloses the roof material application nozzle within the confines of the enclosure to prevent the escape of harmful material and/or noxious fumes into the surrounding atmosphere.

Various other types of filtration units have been used for removing noxious fumes from various types of situations unrelated to the roofing industry, such as shown in U.S. Pat. Nos. 4,450,900, 4,512,245, 4,563,943, 4,804,392, 5,004,483, 5,036,754, 5,069,691, 5,191,909 and 5,281,246. Even though these prior art devices and systems remove harmful fumes from gases and vapors, many of which contain filters for purifying the collected fumes, they are not applicable to the roofing industry since it is necessary that the fume removal system and filtration unit be mobile, enabling the roofer to transport the system rapidly and inexpensively to various job sites in order to be used during the application of the heated roofing material to the roof.

Many of these problems are eliminated by the system for the removal of noxious fumes shown in copending application Ser. Nos. 08/478,785, now U.S. Pat. No. 5,591,244, and 08/639,024. However, it has been found desirable to reduce the emission of noxious fumes from the roofing material directly from the kettle and lugger, and in particular from an extremely compact mobile kettle.

Thus, the need exists for a mobile vessel which is sufficiently compact for mobility, such as being part of a self-powered vehicle, or as a trailer which is pulled by another vehicle, which in addition to providing the heat to liquefy the roofing materials, also incorporates pumping means for delivering the heated material from the vessel onto a roof top such as to a lugger, and which includes filtration means for removing the noxious fumes from the heated material preventing their escape into the surrounding atmosphere.

SUMMARY OF THE INVENTION

Objectives of the invention include providing a mobile vessel for removal of noxious fumes when roofing material is a heated in a material chamber within the vessel to reduce the noxious fumes which escape therefrom into the surrounding atmosphere.

A further objective of the invention is to provide such a mobile vessel which is sufficiently compact to be mounted on a trailer base, yet contain a filtration unit and an air plenum upstream therefrom which provides for mixing of the noxious fumes of the material chamber and from an outside source, such as from a lugger located on an adjacent roof top, with ambient cooling air for cooling the heated fumes to assist in removing heavy particulate materials and various oils therefrom prior to the fumes entering the filtration unit.

Still another objective of the invention is to provide such a vessel having a device for loading kegs of solidified roofing material into the vessel and breaking the solidified kegs into smaller pieces before discharging the pieces into the heated material chamber.

A further object of the invention is to provide such a mobile vessel in which a heater and stirrer is in contact with the material in the chamber to uniformly heat the material throughout before it is pumped by a self-contained pump from the material chamber to a distant location, such as a lugger located on the roof top.

Another objective of the invention is to provide such a mobile vessel containing a blower which creates a negative pressure within the air plenum and filtration unit for moving the noxious fumes and outside ambient air through the filtration unit to facilitate removal of the noxious fumes and odors therefrom.

A still further objective of the invention is to provide such a mobile vessel in which a self contained engine driven generator supplies power to various electric hydraulic devices and associated piping and conduits supply the necessary power to the blower unit, loader/splitter and stirrer mechanisms, thereby eliminating the need of exterior power sources for operation of the mobile vessel.

Still another objective of the invention is to provide such a mobile vessel in which the filtration unit consists a series of filters wherein the various filtering media can be readily changed to more efficiently remove the various components contained within the noxious fumes of a particular roofing material being utilized on a job site.

A further objective of the invention is to provide such a mobile vessel in which the air plenum and filtration unit extend longitudinally throughout the vehicle in a vertical stacked relationship and in a side-by-side position to the material chamber and is separated therefrom by insulated walls to isolate the heated material from the incoming cooling air.

Another objective of the invention is to provide grid bars which are heated by the roofing material in the heated material chamber to facilitate the breaking of the solidified supply or kegs of roofing material into smaller pieces prior to the pieces being discharged into the heated material chamber.

A still further objective of the invention is to provide such a mobile vessel which is relatively compact and mobile and easily transported to a job site and set up for operation with a minimum amount of workers and time, and which can be used in conjunction with a mobile tanker and/or roof lugger.

These objectives and advantages of the present invention are obtained by the mobile vessel, the general nature of which may be stated as including a material chamber for containing a quantity of the material; a filtration unit having an inlet and an outlet; an air plenum separated from the material chamber and communicating with the inlet of the filtration unit; first duct means for transferring fumes emanating from the material within the material chamber into the air plenum; means for moving the fumes through the first means and through the filtration unit then into and then into the atmosphere; and a material chamber for containing a quantity of the material; a filtration unit having an inlet and an outlet; an air plenum separated from the material chamber and communicating with the inlet of the filtration unit; first duct means for transferring fumes emanating from the material within the material chamber into the air plenum; means for moving the fumes through the first means and through the filtration unit then into and the atmosphere; and pump means communicating with the material chamber for delivering material from said chamber to a remote location outside of the vessel.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
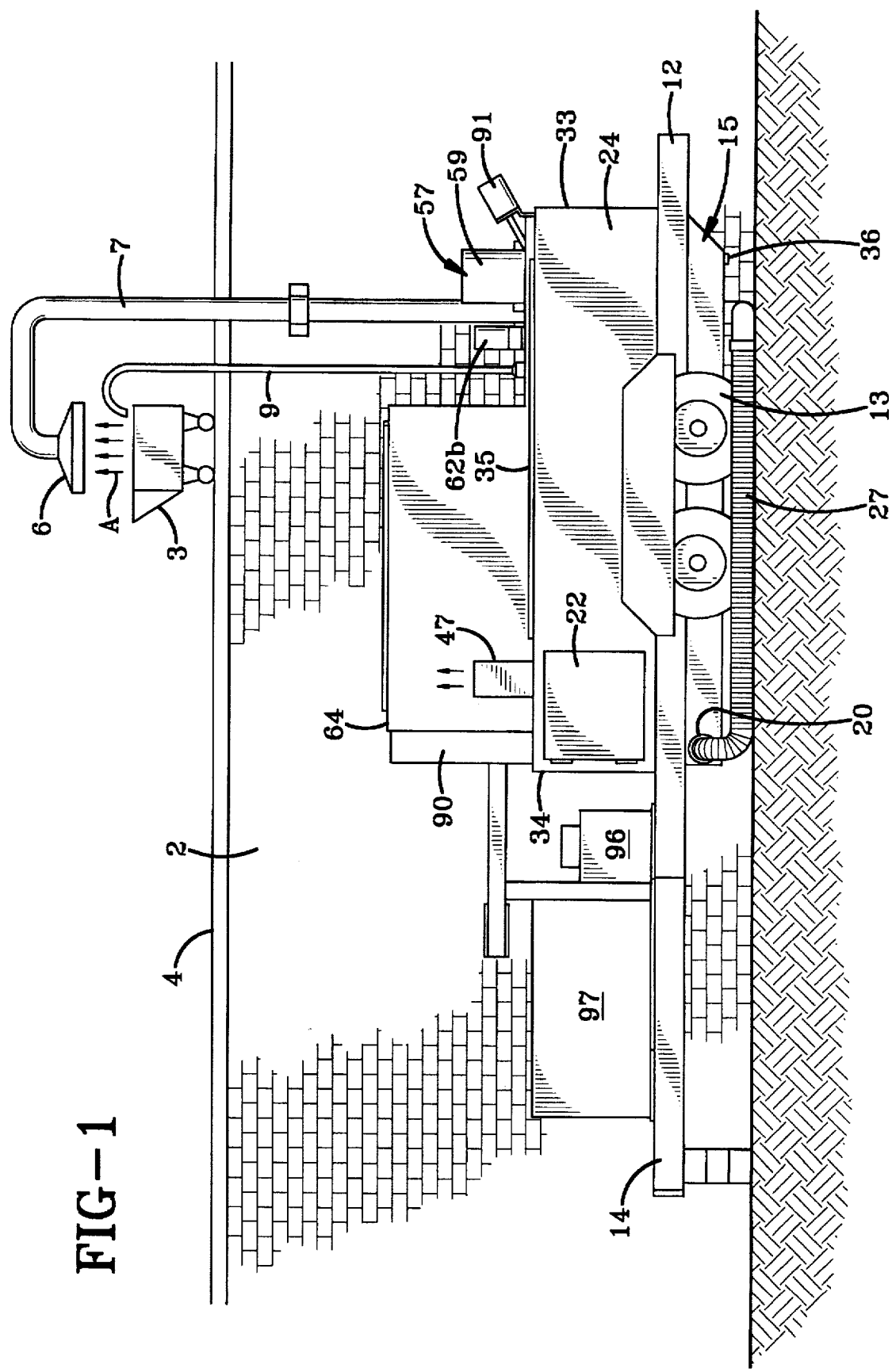
FIG. 1 is a diagrammatic elevational view showing the mobile vessel of the present invention located adjacent a building with a lugger being located on the roof top.

The mobile vessel of the present invention is indicated generally at 1, and is shown in FIG. 1 located adjacent a building 2 having a mobile material carrier 3, commonly referred to as a lugger, located on the roof top 4. A fume removal hood 6 is located above lugger 3 for the collection of noxious fumes emanating therefrom as shown by arrows A, and for delivering the fumes through a conduit 7 to vessel 1 for filtration thereof as described below. A material supply line 9 supplies heated roofing material from vessel 1 to lugger 3, which is also described in further detail below.

Referring to FIGS. 2–5, vessel 1 is a usual trailer-like vehicle having a main support base 12 including a plurality of frame members moveably supported by a plurality of wheels 13. A plurality of channels 14 extend outwardly from the forward end of base 2 providing a drawbar for subsequent connection to a vehicle, such as a truck, for pulling vessel 1 to a remote job site and to provide storage space for the power supply as described below. In the alternative, vessel 1 could be a self-contained and powered vehicle without effecting the concept of the present invention.

In accordance with one of the features of the present invention, an elongated air plenum indicated generally at 15, is mounted on and extends beneath and along a side portion of base 12. Plenum 15 is a substantially enclosed and airtight structure with the exception of a pair of air inlet openings 16 and 17 located at air inlet end 18 of plenum 15. Furthermore, a pair of fume delivery openings 20 and 21 are formed in the side walls 24 of plenum 15. Inlet openings 16 and 17 provide for the injection of outside ambient cooling air into the interior of air plenum 15 with fumes openings 20 and 21 providing for the interjection of the noxious fumes into the plenum. Opening 16 and 17 preferably are adjustable to regulate the flow of incoming cooling air.

Figure 2:
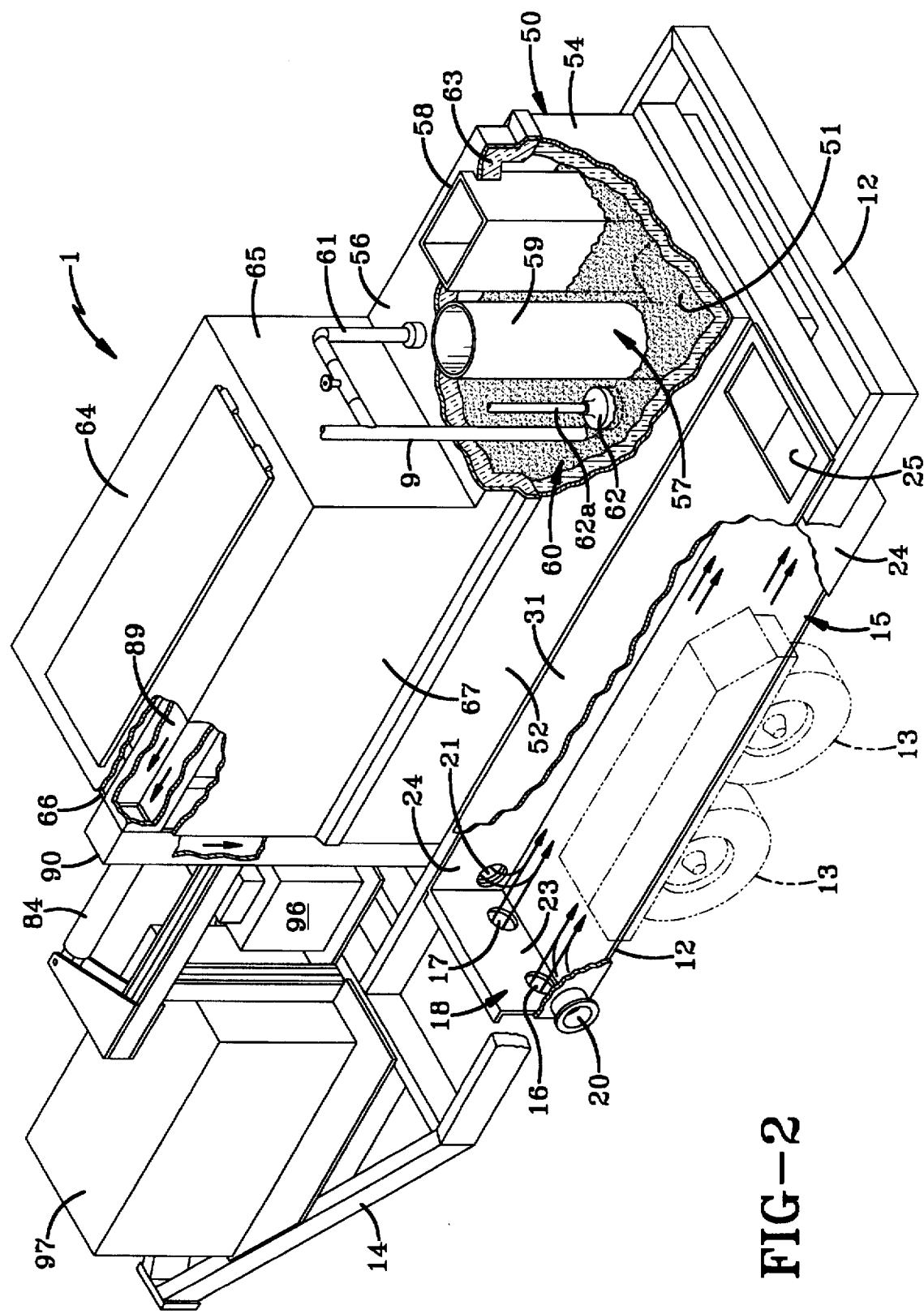
FIG. 2 is an enlarged perspective view of the mobile vessel with portions broken away showing in particular the air plenum and material chamber and associated ducts.

As shown particular in FIG. 2, the air inlet openings emit the outside ambient cooling air substantial perpendicular to the incoming direction of the noxious fumes as shown by the various arrows at inlet end 18 thereof. This assists in slowing down the incoming fumes and providing sufficient agitation for removing the heaver particulate matter and certain oils from the noxious gas streams, which are then deposited within air plenum 15 for subsequent removal therefrom through a drain hole 36. Fume delivery opening 20 is connected to a flexible conduit 27 (FIG. 2) which in turn is connected to conduit 7, so that the fumes collected by hood 6 are transported through conduits 7 and 27 for subsequent discharge into lair plenum 15 where they are immediately mixed and cooled by the incoming air through air inlet opening 16.

In further accordance with the invention, a filtration unit indicated generally at 30 (FIG. 3), is mounted vertically above and on a plate 31 which may form the top wall of air plenum 15 or be a separate component, and extends substantially throughout the longitudinally length of base 12. Filtration unit 30 is located within a substantially airtight chamber formed by plate 31 or a separate top wall of air plenum 15, spaced parallel side walls and spaced parallel end walls 33 and 34, and a top wall 35. The inlet end indicated at 37, of filtration unit 30, is adjacent outlet opening 25 of air plenum 15 so that the mixed noxious fumes and cooling air immediately upon leaving air plenum 15, will enter the initial stage of filtration unit 30 where it is directed by a curved baffle plate 26.

Referring again to FIG. 3, filtration unit 30 includes a number of individual filtration compartments connected in an end-to-end relationship and mounted and extending along the flat top wall of air plenum 15 or plate 31. Preferably filtration unit 30 includes a first stage 37 referred to as an impinger module, which contains a series of impingers formed of sheet metal and an aluminum mesh filter. The next filtration stage indicated at 38, is referred as a multi-vee filter which is used as a prefilter for larger particulate and dry or slightly wet vapors of gas or dust. The vee-filter usually contain a disposable treated paper filter medium. Next is a mist collector V-Bag 38a which removes the fine oils and particles in the gas stream. The next filtering stage 39 is referred to as HEPA cabinet and junctions as a secondary fine filter for removing smoke fines and soot. It will contain a fine particulate air filtering material having an efficiency rating of at least 99% at 0.3 microns. The final filtering stage 40 is a carbon filter and contains a plurality of trays 41 containing granular activated carbon. The activated carbon will remove odors, gases and vapors remaining in the fumes after the fumes leave HEPA cabinet 39. The particular arrangement and components of filtration unit 30 described above may vary without affecting the concept of the present invention, although the particular sequence of components described has been found to be satisfactory for many roofing applications.

The outlet end 43 of filtration unit 30 communicates directly with blower chamber 45 in which a blower 46 is mounted having a usual internal blower, preferably driven by an electric motor 28, and includes a housing 47 with an access door 22 and a discharge opening 48 through which the filtered vapors are discharged into the surrounding atmosphere, as indicated by arrows "B". The other substantially one-half portion of vessel 1 is occupied by a material chamber indicated generally at 50, which extends substantially throughout the longitudinally length of vessel 1 and is located in juxtaposition with air plenum 15 and filtration unit 30. Material chamber 50 is hollow having an internal storage compartment 51 (FIG. 5) and is formed by spaced parallel side walls 52 and 53, a rear wall 54 and a front wall 55. The rear portion of material chamber 50 includes a top wall 56. A usual heater supplied by L.P. gas, indicated generally at 57, is mounted within storage compartment 51 and includes an inlet portion 58 and outlet portion 59 and is of usual construction well know in the kettle art for heating the roofing material, which is indicated generally at 60, and which is located and contained within compartment 51.

Material supply line 9 extends through top wall 56 into storage compartment 51 and is pumped therefrom by a usual, preferably electric driven, kettle pump 62, also well known in the art, for delivering material 60 through supply line 9 for discharge into lugger 3 for subsequent distribution on roof top 4. Pump 62 includes a drive shaft 62a which is driven by a usual electric motor 62b located exteriorly on top wall 56. A material bypass line 61 extends between pipe 9 and chamber 51 for return of heated bituminous material, should the need arise. As shown particular in FIGS. 2 and 4, the walls forming material chamber 50 are insulated as shown at 63, to retain the heat generated by heater 57 within storage compartment 51 and to prevent its heating of the filtration unit, and particularly of air plenum 15.

Figure 4:
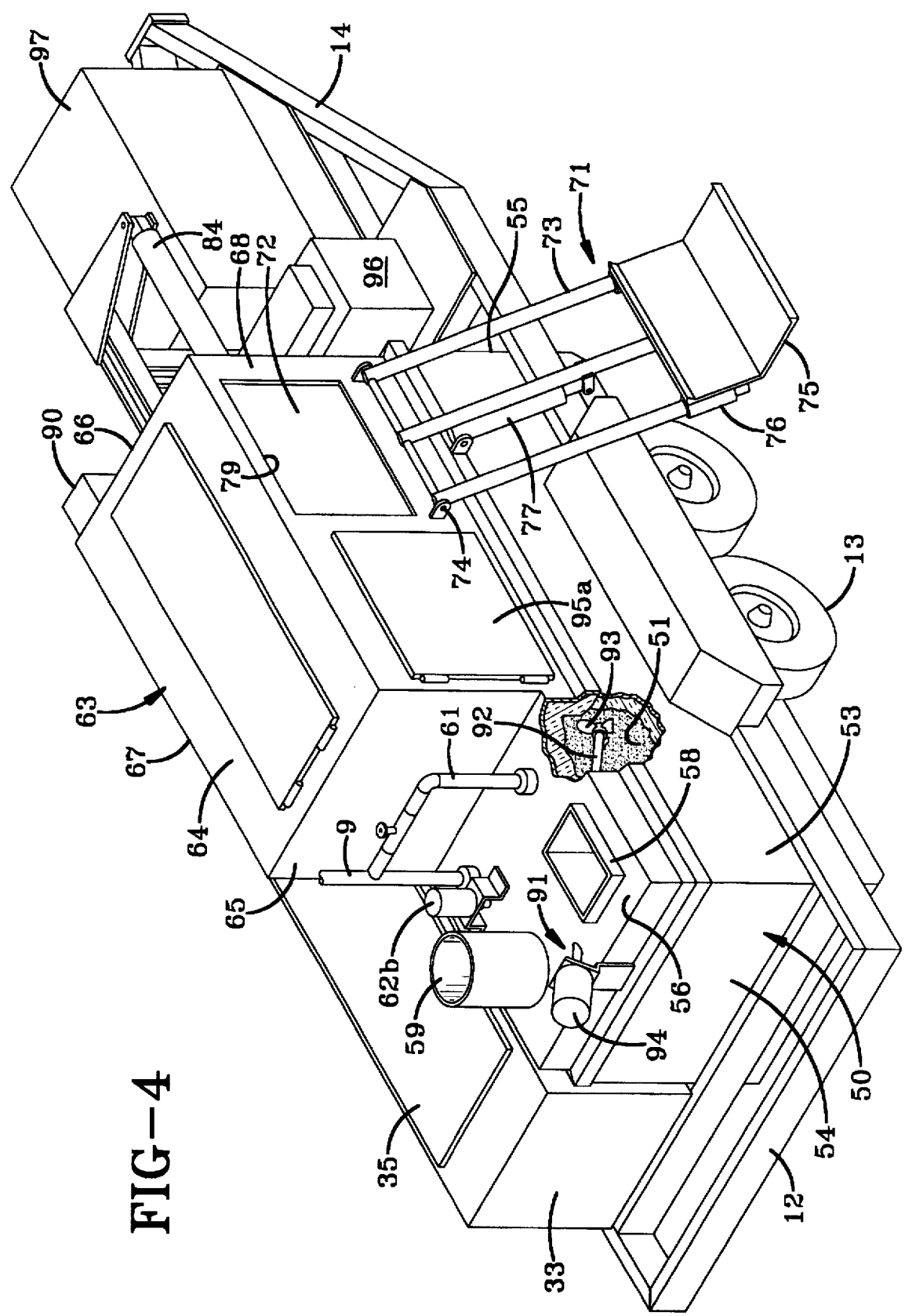
FIG. 4 is a perspective view opposite to that of FIGS. 2 and 3 showing in particular the material loading mechanism, with portions of the material chamber broken away to show the stirrer mechanism.
Figure 5:
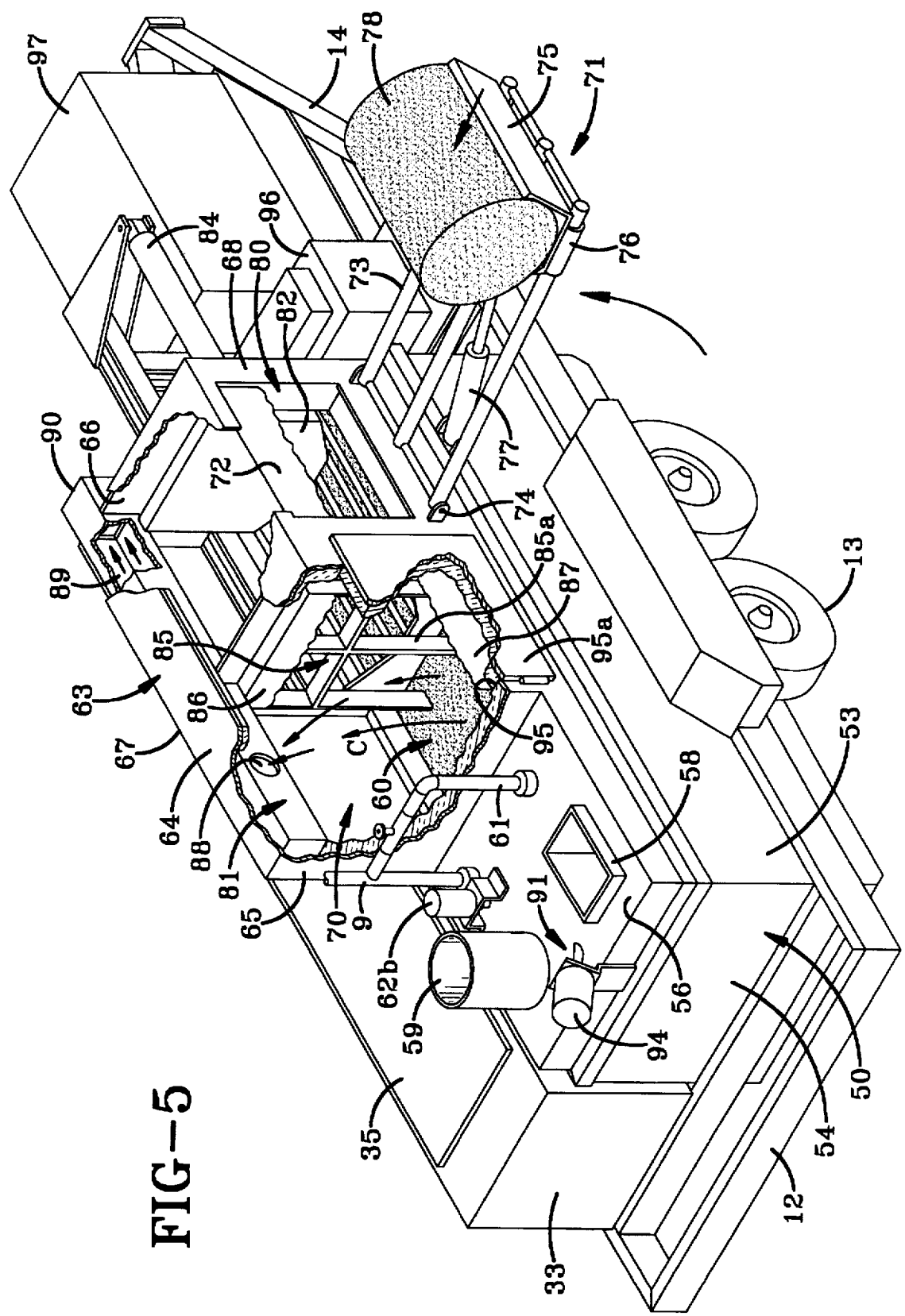
FIG. 5 is a perspective similar to FIG. 4 with additional portions broken away showing the material loading mechanism, heated breaker bars and portions of the material chamber and associated duct work for removing the noxious fumes therefrom.

In further accordance with the invention as best shown in FIGS. 4 and 5, is a material feed or load housing, indicated generally at 63. Housing 63 is mounted on the forward half-portion of material chamber 50 and includes a top wall 64, a rear wall 65 and a front wall 66 and spaced parallel side walls 67 and 68, and an open slotted bottom formed by a plurality of longitudinal channels 69, which form a main hollow interior compartment.

A material feed hoist indicated generally at 71, includes a plurality of spaced parallel slide rods 73 which are pivotally mounted at one end by a pivot mechanism 74, and has a slide carriage 75 which is slidably movably mounted thereon by sleeve bearings 76. A pressure actuated cylinder 77 pivotally moves hoist 71 from its load position as shown in FIG. 4, to its material discharge position shown in FIG. 5. In the discharge position of FIG. 5, rods 73 are raised slightly above the horizontal so that slide rack 75 can be manually slid easily along the slide rods on bearings 76 to discharge a solidified keg of roofing material 78 into feed housing 63 and onto channels 69. Alternatively rods 73 may be replaced with channels and slide rack 75 may be movably mounted on these channels by a plurality of rollers or wheels without effecting its operation described above.

Housing 63 is divided into a forward material receive chamber 80 and a rear fume collection and material discharge chamber 81 (FIG. 5). A push plate 82 is located at the forward end of chamber 80 and is moved rearwardly by a hydraulic pressure actuated cylinder 84 for breaking the solidified roof material keg 78 into smaller pieces for discharge into the heated pool of roof material 60 located below material discharge chamber 80. A material access opening 79 is formed in wall 68 and is provided with a movable closure flaps 72 which extends throughout the height and width of opening 79, to assist in preventing the escape of fumes from within chamber 90.

Chambers 80 and 81 are separated by a grid 85 (FIG. 5) formed by a plurality of spaced vertical and horizontal bars wherein the vertical bars 85a extend downwardly into heated material 60 of chamber 50 which subsequently heats both the horizonal and vertical grid bars to assist in breaking apart material keg 78 as it is pushed against and through grid 85 by push plate 82 and cylinder 84. A moveable closure plate or flap 86 extends throughout the height of grid 85 to reduce the escape of fumes from chamber 81 into chamber 80. Another flexible flap or closure plate 87 extends across an access opening 95 formed in wall 68 and which is accessible through a door 95a.

Thus, to load a solid keg of roofing material 78, the keg is place either with or without its protective paper cover on slide rack 75 which is then raised from its lower position of FIG. 4 to its discharge position of FIG. 5 by cylinder 77. Rack 75 is then manually pushed along slide rod 73 and into chamber 80 through opening 79 after which cylinder 84 is actuated which breaks keg 78 into pieces as it is pushed through heated grid 85 wherein the pieces fall into the pool of roofing material 60 located below. Flaps or closure plates 72, 86 and 87 assist in retaining the noxious fumes emanating from material 60 from escaping into the surrounding atmosphere.

Figure 3:
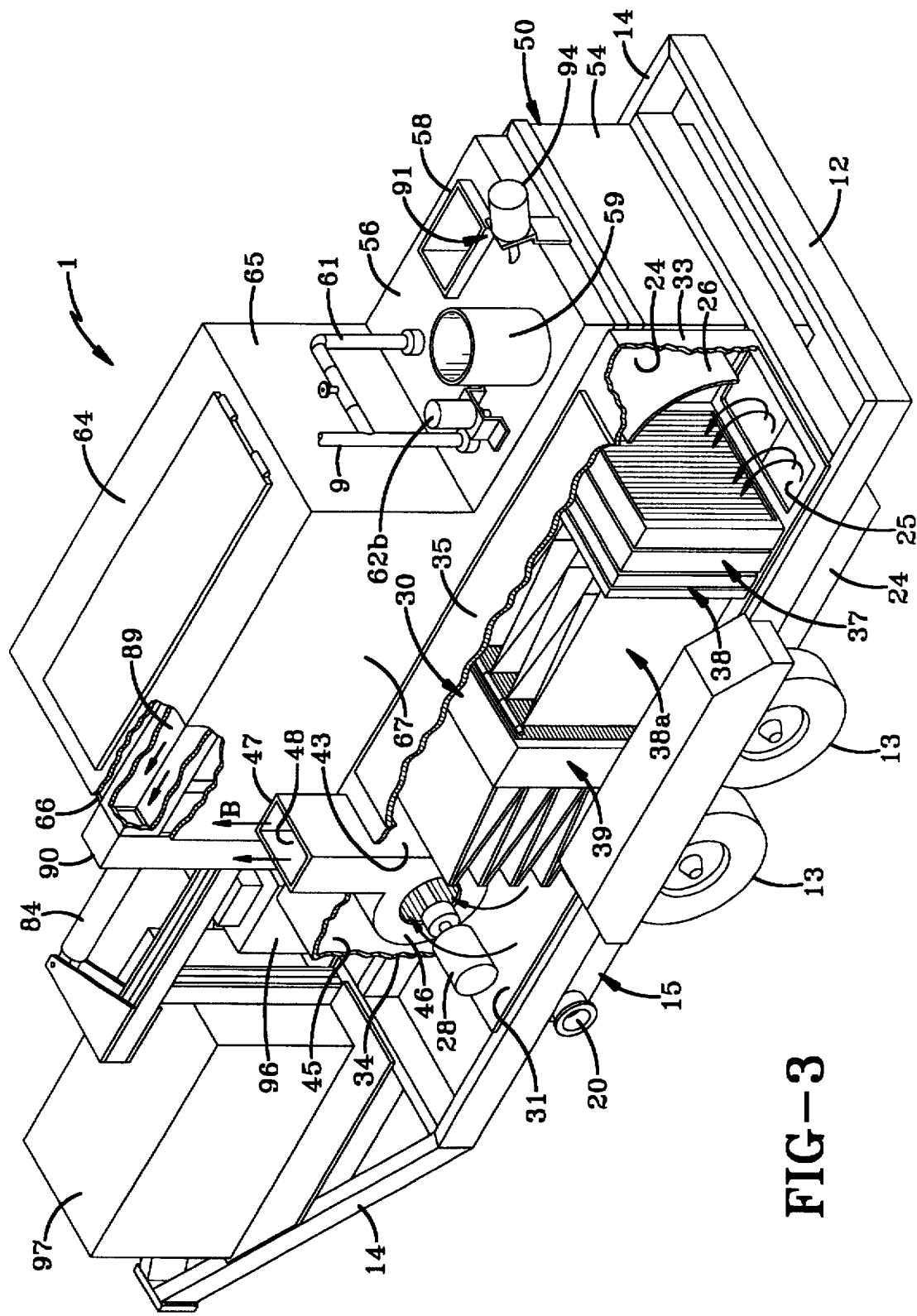
FIG. 3 is a perspective view similar to FIG. 2, with additional portions broken away to show in particular the filtration unit and blower.

In accordance with another feature of the invention, a fume discharge outlet 88 is formed in a side wall of a material discharge conduit 89 whereby the fumes indicated by arrow "C" (FIG. 5) move through opening 88 and horizontally along conduit 89. The fumes are then directed in a vertical downward direction (FIG. 2) in another conduit section 90 which communicates with conduit 89. The lower end of conduit 90 communicates with fumes delivery opening 21 so that the negative pressure created within air plenum 15 will draw the fumes from material chamber 50 and rear chamber 81 as shown in FIG. 5, through conduits 89 and 90 for delivery into the air plenum as shown in FIG. 2, where they are then mixed with the incoming ambient air entering the air plenum through inlet air opening 17 for subsequent discharge through plenum outlet 25 and into filtration unit 30 as shown in FIG. 3. The negative pressure created by blower 46 will draw fumes "C" into duct 89, and in combination with the various flaps, prevent them from escaping through keg loading opening 79.

In accordance with still another feature of the invention, a stirrer indicated at 91 (FIG. 4), which includes a shaft 92 and an agitating mixer 93 is located within the material liquid pool and is rotated by an electric motor 94. Stirrer 91 enables the heated material to be continually mixed to uniformly spread the heat generated by heater 57 throughout to maintain a constant material temperature and to assist in melting the solidified pieces of material after keg 78 is broken into smaller pieces by grid 85. Thus, vessel 1 is easily driven or pulled to a job site as shown in FIG. 1, at which location, flexible conduit 27 will be connected to conduit: 7 extending from lugger hood 6. Noxious fumes A being discharged by the roofing material within lugger 3, is drawn through conduits 7 and 27 into air plenum 15 by the negative pressure created by blower 46 where it is mixed with the incoming air, and where it also mixes with the fumes being discharged by material 60 within the material storage compartment. These fumes are drawn through conduits 89 and 90 (FIGS. 2 and 5) and discharged through opening 21 where they immediately mix with incoming air through opening 17 for equal distribution and movement through air plenum 15.

Thus, vessel 1 provides for collecting and filtering the noxious fumes which emanates from the material within the kettle, as well as provides a convenient mechanism for collecting the fumes from a roof lugger or other secondary vessel or location containing noxious fumes, if desired, which are then delivered back into the vessel for subsequent filtration prior to being discharged into the surrounding atmosphere through discharge opening 48.

As can be seen in the drawings, vessel 1 is relatively compact and contains a substantial length and size of air plenum 15 and filtration unit 30 due to their vertical stacked arrangement in juxtaposition with the heated material storage chamber. Vessel 1 also is provided with material receive and discharge chambers 80 and 81 whereby solid kegs of roofing material are loaded easily into the vessel and broken apart into smaller pieces where they are automatically deposited into the healed pool of roofing material without any further manipulation being required by an operator of the vessel except for the movement of material slide rack 75 along the slide rods or channels. Furthermore, the individual compartments are separated from each other by insulated walls and flaps so that the heat of material 60 and fumes are retained within the desired locations and do not affect the adjacent filtration unit and cooling air plenum, as well as insulating the heated material and fumes from the surrounding atmosphere so that the material within chamber 50 most economically and efficiently utilizes the heat provided by heater 57.

Blower 46, kettle pump 62 and stirrer motor 94 preferably are electrically driven by a self-contained generator 96. Pressure actuated cylinders 77 and 84, preferably are hydraulically actuated and are supplied hydraulic fluid by readily available self-contained electric/hydraulic power packs 97 (FIG. 1) mounted at the forward end of the vessel on base 12 adjacent generator 96. This eliminates the need for any exterior power and provides for an entirely self-contained vessel, since various sources of power are not readily available at many roofing sites. However, it is easily seen that these specified power sources can be replaced with other types of power sources without affecting the main concept of the present invention.

Accordingly, the improved mobile vessel is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved mobile vessel for removal of noxious fumes is constructed and used, the characteristics of the construction, and the advantageous, new and useful results obtained, the new and useful structures, devices, elements, arrangements, parts and combinations, are set forth in the appended claims.

We claim:

1. A mobile vessel for reducing the transmission of noxious fumes into the surrounding atmosphere emanating from a material contained in the vessel, said vessel including:

a material chamber for containing a quantity of the material;

heater means in the material chamber for heating said material;

a filtration unit having an inlet and an outlet extending generally horizontally throughout a substantial length of the vessel;

an air plenum separated from the material chamber and communicating with the inlet of the filtration unit, said air plenum having an inlet end and an outlet end and extending generally horizontally throughout a substantial length of the vessel in juxtaposition to the filtration unit with said outlet end being in communication with the inlet of said filtration unit whereby fumes entering the filtration unit reverse direction of movement upon leaving the outlet of the air plenum;

first duct means for transferring fumes emanating from the material within the material chamber into the air plenum, said first duct means having a cross-sectional area smaller than the cross-sectional area of the air plenum whereby the fumes have a lower velocity when moving through the air plenum than when moving through said first duct means;

a material feed compartment communicating with the material chamber;

blower means for creating a negative pressure in the air plenum, filtration unit and material feed compartment for moving the fumes through the first duct means and through the filtration unit then into the atmosphere; and pump means communicating with the material chamber for delivering material from said chamber to a remote location outside of the vessel.

2. The mobile vessel defined in claim 1 including second duct means for transferring fumes emanating from another source of material outside of the vessel into the air plenum.

3. The mobile vessel defined in claim 2 in which the air plenum extends beneath the filtration unit.

4. The mobile vessel defined in claim 3 in which the first and second duct means communicate with the air plenum adjacent the inlet end of said air plenum; and in which the air plenum includes air intake means adjacent the first and second duct means for mixing ambient air with the fumes entering the air plenum through said first and second duct means.

5. The mobile vessel defined in claim 4 in which the air intake means is substantially perpendicular to the inlet ends of the first and second duct means.

6. The mobile vessel defined in claim 1 in which the air plenum and filtration unit are arranged in a vertical stacked relationship and are in juxtaposition with the material chamber.

7. The mobile vessel defined in claim 1 including stirrer means extending into the material chamber for stirring the material within said chamber.

8. The mobile vessel defined in claim 1 in which the pump means includes a delivery pipe extending from the material chamber, and a material return pipe extending between said delivery pipe and the material chamber.

9. The mobile vessel defined in claim 1 including a material feed compartment communicating with the material chamber; and in which means is mounted on the vessel for delivering the material in a solidified state into said material feed compartment.

10. The mobile vessel defined in claim 9 including breaker means for breaking the solidified material into small prices before discharging said pieces into the material chamber.

11. The mobile vessel defined in claim 10 in which the breaker means includes a power operated ram and breaker bars said ram moving the solidified material against said breaker bars for breaking said material into the smaller pieces.

12. The mobile vessel defined in claim 11 in which the breaker bars are arranged in a grid fashion; and in which lower ends of certain of said bars extend into the material chamber for heating said bars.

13. The mobile vessel defined in claim 11 in which the first duct means includes an inlet communicating with the material chamber through the material feed compartment.

14. The mobile vessel defined in claim 13 in which the first duct means includes a first duct section which extends substantially horizontally along an upper portion of the material feed compartment and a second duct section which extends vertically and terminating adjacent the inlet end of the air plenum.

15. The mobile vessel defined in claim 9 in which moveable flap means is mounted between the material feed compartment and the material chamber to reduce the transmission of noxious fumes therebetween.

16. The mobile vessel defined in claim 9 in which the material feed compartment is provided with an access door for delivering material into said compartment; and in which movable flap means extend across said access door.

17. The mobile vessel defined in claim 9 in which the solidified material delivery means includes a pressure actuated hoist moveable between a lowered material receive position and a raised material discharge position; and in which said hoist includes a slide rack and a carriage moveably mounted thereon.

18. The mobile vessel defined in claim 1 in which the filtration unit includes a mesh filter for removing particulates from the fumes, a HEPA filter for removing fine particles passing through the mesh filter, and a carbon filter for removing odors, gases and vapors from the fumes.

\* \* \* \* \*